(12) United States Patent
Dilger et al.

(10) Patent No.: US 8,386,835 B2
(45) Date of Patent: Feb. 26, 2013

(54) SYSTEM AND METHOD FOR END-TO-END DATA INTEGRITY IN A NETWORK FILE SYSTEM

(75) Inventors: Andreas E. Dilger, Calgary (CA); Eric Barton, Bristol (GB); Rahul S. Deshmukh, Pune (IN)

(73) Assignee: Oracle International Corporation, Redwood City, CA (US)

( * ) Notice: Subject to any disclaimer, the term of this patent is extended or adjusted under 35 U.S.C. 154(b) by 253 days.

(21) Appl. No.: 12/781,516

(22) Filed: May 17, 2010

(65) Prior Publication Data

US 2011/0283085 A1 Nov. 17, 2011

(51) Int. Cl.
*G06F 11/08* (2006.01)
*G06F 11/00* (2006.01)
(52) U.S. Cl. .......... 714/6.1; 714/4.1; 714/6.24; 714/42; 714/52; 711/216
(58) Field of Classification Search .............. 714/4.1, 714/6.1, 6.24, 15, 18, 42, 43, 49, 52, 54, 714/786; 711/216; 713/168, 177, 189, 193
See application file for complete search history.

(56) References Cited

U.S. PATENT DOCUMENTS

| | | | | |
|---|---|---|---|---|
| 4,309,569 A | * | 1/1982 | Merkle | 713/177 |
| 2006/0123250 A1 | * | 6/2006 | Maheshwari et al. | 713/193 |
| 2008/0091945 A1 | * | 4/2008 | Princen et al. | 713/170 |
| 2008/0172562 A1 | * | 7/2008 | Cachin et al. | 713/193 |
| 2010/0110935 A1 | * | 5/2010 | Tamassia et al. | 370/256 |

OTHER PUBLICATIONS

Panzer-Steindel, Bernd, "Data Integrity," CERN/IT, Draft 1.3, Apr. 8, 2007 (7 pages).
"Lustre™ File System: High-Performance Storage Architecture and Scalable Cluster File System White Paper," Sun Microsystems, Inc., Dec. 2007 (20 pages).
Merkle, Ralph C., "A Digital Signature Based on a Conventional Encryption Function," Lecture Notes in Computer Science; vol. 293, A Conference on the Theory and Applications of Cryptographic Techniques on Advances in Cryptology, Aug. 16, 1987 (10 pages).
Ferguson, N., Lucks, S., Schneier, B., Whiting, D., Bellare, M., Kohno, T., Callas, J., and Walker, J., "The Skein Hash Function Family", Version 1.1, Nov. 15, 2008 (79 pages).
Bonwick, J. and Moore, B., "ZFS: The Last Word in File Systems," presented at the SNIA Software Developers' Conference, Sep. 2008 (38 pages).

* cited by examiner

*Primary Examiner* — Joseph D Manoskey
(74) *Attorney, Agent, or Firm* — Osha Liang LLP

(57) ABSTRACT

A computer readable storage medium, embodying instructions executable by a computer to perform a method, the method including: validating a memory write of data segments using a first number of leaf hashes of a first hash tree, where each of the first number of leaf hashes is associated with one of the data segments of a first block size, generating interior node hashes based on the first number of leaf hashes, where each of the interior node hashes is associated with a second block size, generating a first root hash using the interior node hashes, where the first root hash is associated with a remote procedure call size, transmitting the first root rash and the data segments to a network file system, where the transmission is performed using the remote procedure call size, and validating the transmission of the data segments using the first root hash.

17 Claims, 5 Drawing Sheets

SYSTEM AND METHOD FOR END-TO-END DATA INTEGRITY IN A NETWORK FILE SYSTEM

BACKGROUND

As the demand for storage continues to grow, larger and more sophisticated storage systems are being designed and deployed. For example, in the High Performance Computing (HPC) community, many sites have deployed distributed file systems containing tens of thousands of disk drives and tens of petabytes of storage. The increase in the number of components and the volume of data results in a significantly increased likelihood of data corruption.

Typically, a distributed file system is made up of a collection of servers that are presented as a single large file system to clients. Each server within the distributed file system stores data or metadata in a locally consistent backing file system that is invisible to the users. In this case, the distributed file system uses checksums of data to detect corruption that occurs during transmission over the network from the client to the storage servers. Further, the backing file system may also perform a separate checksum to detect on-disk corruption.

SUMMARY

In general, in one aspect, the invention relates to a computer readable storage medium, embodying instructions executable by a computer to perform a method, the method including: validating a memory write of a plurality of data segments using a first plurality of leaf hashes of a first hash tree, where each of the first plurality of leaf hashes is associated with one of the plurality of data segments of a first block size, generating a plurality of interior node hashes based on the first plurality of leaf hashes, where each of the plurality of interior node hashes is associated with a second block size, generating a first root hash using the plurality of interior node hashes, where the first root hash is associated with a remote procedure call size, transmitting the first root rash and the plurality of data segments to a network file system, where the transmission is performed using the remote procedure call size, and validating the transmission of the plurality of data segments using the first root hash.

In general, in one aspect, the invention relates to a system for ensuring data integrity using hash trees, including a client node including a processor and a memory, the memory including software instructions for enabling the processor to: validate a memory write of a plurality of data segments using a first plurality of leaf hashes of a first hash tree, where each of the first plurality of leaf hashes is associated with one of the plurality of data segments of a first block size, generate a plurality of interior node hashes based on the first plurality of leaf hashes, where each of the plurality of interior node hashes is associated with a second block size, generate a first root hash using the plurality of interior node hashes, where the first root hash is associated with a remote procedure call size, and transmit the first root rash and the plurality of data segments to a network file system, where the transmission is performed using the remote procedure call size. The system further includes the network file system configured to validate the transmission of the plurality of data segments using the first root hash.

In general, in one aspect, the invention relates to a method for ensuring data integrity using hash trees, including: validating a memory write of a plurality of data segments using a first plurality of leaf hashes of a first hash tree, where each of the first plurality of leaf hashes is associated with one of the plurality of data segments of a first block size, generating a plurality of interior node hashes based on the first plurality of leaf hashes, where each of the plurality of interior node hashes is associated with a second block size, generating a first root hash using the plurality of interior node hashes, where the first root hash is associated with a remote procedure call size, transmitting the first root rash and the plurality of data segments to a network file system, where the transmission is performed using the remote procedure call size, and validating the transmission of the plurality of data segments using the first root hash.

Other aspects of the invention will be apparent from the following description and the appended claims.

DETAILED DESCRIPTION

Figure 1:
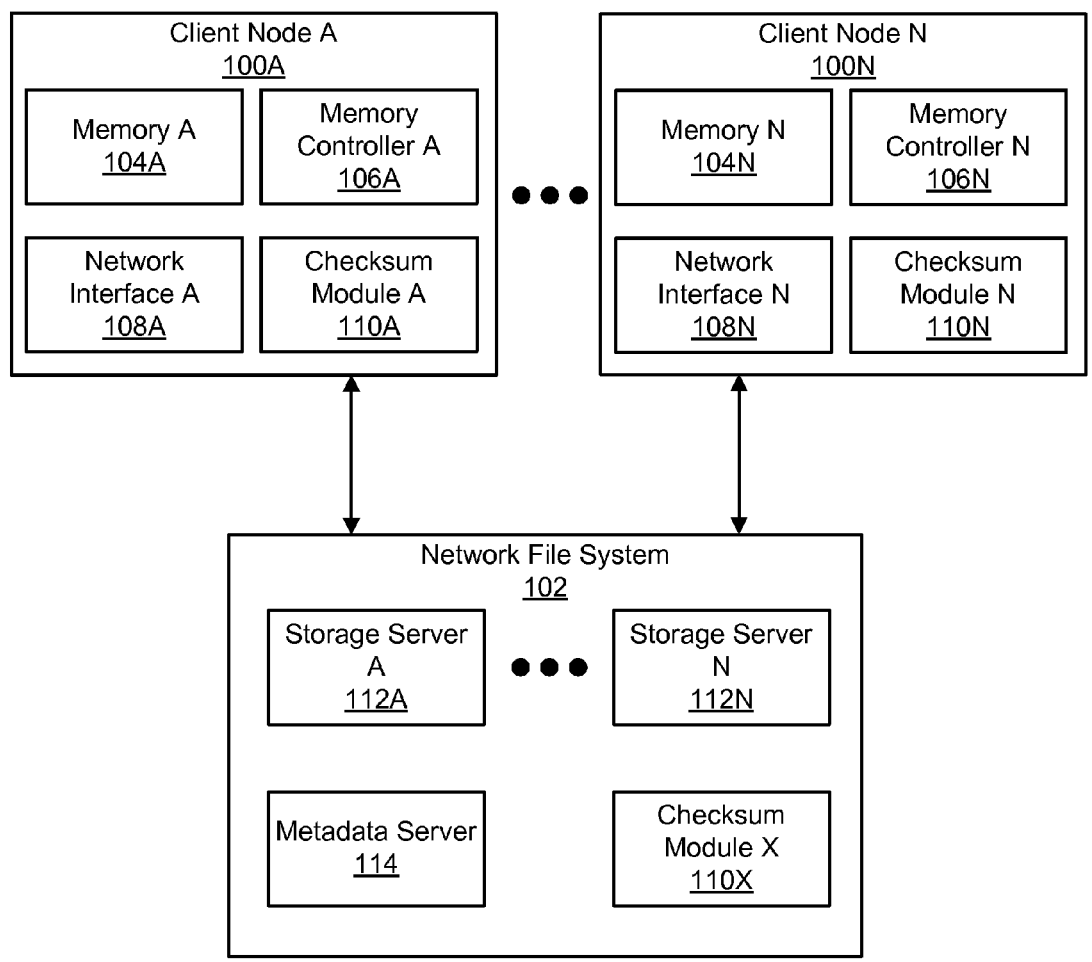
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicated the description.

In general, embodiments of the invention provide a system and method for end-to-end data integrity in a network file system. Specifically, a scalable hash method (i.e., hash tree or Merkle hash) may be used to perform data integrity verification from client memory through the network and onto persistent storage (i.e., throughout the data pipeline). In one or more embodiments of the invention, the scalable hash tree allows for computed hashes to be reused during different stages of the data pipeline (i.e., a chain of data processing stages associated with the network file system). A hash computed to verify the integrity of persistent storage may be stored as leaf data segments and reused to build interior and root hashes of varying block sizes in the scalable hash tree. In this case, the root hash having a block size of a remote procedure call may be used to verifying the data integrity of data being transferred through a network.

FIG. 1 shows a diagram of a system in accordance with one or more embodiments of the invention. The System (100) includes client nodes (e.g., Client Node A (100A), Client Node N (100N)) interacting with a Network File System (102). Each client node (i.e., Client Node A (100A), Client Node N (100N)) includes memory (Memory A (104A), Memory N (104N)), a memory controller (Memory Controller A (106A), Memory Controller N (106N)), a network interface (Network Interface A (108A), Network Interface N (108N)), and a checksum module (Checksum Module A (110A), Checksum Module N (110N)). The Network File System (102) further includes storage servers (e.g., Storage Server A (112A), Storage Server N (112N)), a Metadata Server (114), and a Checksum Module X (110X). Each of the aforementioned components of FIG. 1 is discussed below.

Client Nodes (e.g., Client Node A (100A), Client Node N (100N)) may be any computing device, as discussed below, capable of interacting with network data of the Network File System (102). More specifically, each client node (e.g., Client Node A (100A), Client Node N (100N)) may be configured to store and retrieve data from the Network File System (102). For example, the Client Nodes (e.g., Client Node A (100A), Client Node N (100N)) may be servers on a network, a cluster, a server farm, or some other grouping of server systems.

In one or more embodiments of the invention, each client node (e.g., Client Node A (100A), Client Node N (100N)) is configured to perform operations in memory (Memory A (104A), Memory N (104N)) using a memory controller (Memory Controller A (106A), Memory Controller N (106N)) before the results are stored in persistent storage. Memory (Memory A (104A), Memory N (104N)) may correspond to any tangible storage medium requiring power to maintain stored data (e.g., random access memory, processor cache, etc.). Persistent storage may be any tangible storage medium capable of maintaining stored data without power (e.g., hard disk(s), flash memory, etc.). In one or more embodiments of the invention, the memory controller (Memory Controller A (106A), Memory Controller N (106N)) is configured to use the checksum module (Checksum Module A (110A), Checksum Module N (110N)) to verify the integrity of data stored in memory (Memory A (104A), Memory N (104N)).

In one or more embodiments of the invention, each client node (e.g., Client Node A (100A), Client Node N (100N)) is configured to communicate over a network using a network interface (Network Interface A (108A), Network Interface N (108N)). For example, a client node may use the network interface (Network Interface A (108A), Network Interface N (108N)) to send and/or receive data from other client nodes and/or the Network File System (102). In one or more embodiments of the invention, the network interface (Network Interface A (108A), Network Interface N (108N)) is configured to use the checksum module (Checksum Module A (110A), Checksum Module N (110N)) to verify the integrity of network data.

In one or more embodiments of the invention, each client node (e.g., Client Node A (100A), Client Node N (100N)) is configured to use a checksum module (i.e., Checksum Module A (110A) and Checksum Module N (110N)) to perform data integrity verifications. Specifically, the checksum module (i.e., Checksum Module A (110A) and Checksum Module N (110N)) may be configured to use a hash tree to verify both data in memory (Memory A (104A), Memory N (104N)) of the client node and network data transferred using the network interface (Network Interface A (108A), Network Interface N (108N). In this case, the checksum module (i.e., Checksum Module A (110A) and Checksum Module N (110N)) may be configured to maintain the hash tree when performing data verification. For example, the checksum module (i.e., Checksum Module A (110A) and Checksum Module N (110N)) may be configured to generate leaf hashes for data segments of a hash tree in response to a memory access of the data segments from memory (Memory A (104A), Memory N (104N)). In this example, the block size of the leaf data segments may be 4096 bytes (4 kilobytes). The checksum module (i.e., Checksum Module A (110A) and Checksum Module N (110N)) may also be configured to use the leaf hashes to generate interior hashes and a root hash of the hash tree. In this case, each level of the hash tree may be of an incremental block size (e.g., 8 kilobytes, 16 kilobytes, 32 kilobytes, 64 kilobytes, 128 kilobytes, 256 kilobytes, 512 kilobytes, 1024 kilobytes), where each block size is related to a different portion of the data pipeline (e.g., 4 kilobytes corresponding to a minimum page size, 64 kilobytes corresponding to a maximum page size, 128 kilobytes corresponding to a block size of the Network File System (102), 1024 kilobytes corresponding to a remote procedure call size).

In one or more embodiments of the invention, the Network File System (102) is configured to manage network data. In this case, the Network File System (102) may be a distributed file system configured to manage distributed data on storage servers (e.g., Storage Server A (112A), Storage Server N (112N)). More specifically, the Network File System (102) may be configured to store and retrieve distributed data for the client nodes (e.g., Client Node A (100A), Client Node N (100N)). In this case, the client nodes (e.g., Client Node A (100A), Client Node N (100N)) may access storage on the storage servers (e.g., Storage Server A (112A), Storage Server N (112N)) indirectly using a Metadata Server (114) of the Network File System (112). For example, the Network File System (112) may use the Metadata Server (114) to manage permissions, file locations, directories, etc. Examples of network file systems include, but are not limited to, the Network File System, the Andrew File System, Common Internet File System, and the Lustre File System.

In one or more embodiments of the invention, each of the storage servers (e.g., Storage Server A (112A), Storage Server N (112N)) may store data in one or more storage targets, where each storage target includes multiple local disk file systems. In this case, a request to access a file of the Network File System (112) may require use of the Metadata Server (114) to perform a filename lookup that results in a mapping of the file to multiple storage targets (i.e., portions of the file are distributed over multiple storage targets). Examples of local disk file systems include, but are not limited to, the new technology file system ("NTFS"), the extended file system, the third extended file system ("ext3"), and the zettabyte file system ("ZFS") file system.

Those skilled in the art will appreciate that the Network File System (102) may also be configured as a single storage server. In this case, the Network File System (102) may include a local disk file system as described above, where the Network File System (102) manages network data stored in the local disk file system.

In one or more embodiments of the invention, the Network File System (102) includes a Checksum Module X (110X) for performing data integrity verification. The Checksum Module X (110X) may perform data integrity verification as described above with respect to the checksum modules (e.g., Checksum Module A (110A), Checksum Module N (110N)) of the client nodes (e.g., Client Node A (100A), Client Node N (100N)). For example, the Network File System (102) may use the Checksum Module X (110X) to verify the data integrity of data stored on the local disk file systems of the storage servers (e.g., Storage Server A (112A), Storage Server N (112N)). In this example, the block size of the data stored on the local disk file systems may be 8 kilobytes, where the blocks of the local disk file systems correspond to data segments of leaf hashes.

In one or more embodiments of the invention, the client nodes (e.g., Client Node A (100A), Client Node N (100N)) and Network File System (102) may be configured to use the checksum modules to share hash tree information for ensuring end-to-end data integrity. For example, a single hash tree may be generated and stored by a checksum module (Checksum Module A (110A), Checksum Module B (110B)) on a client node (e.g., Client Node A (100A), Client Node N (100N)) to verify data integrity when the data is stored in memory (Memory A (104A), Memory N (104N)) and then to verify data integrity again when the data is transmitted using the network interface (Network Interface A (108A), Network Interface N (108N). In this example, the root hash and/or the hash tree may then be transmitted to the Network File System (102) via the network interface (Network Interface A (108A), Network Interface N (108N), where the root hash and/or hash tree is used by the Checksum Module X (110X) to verify data integrity when the data is stored on a storage server (e.g., Storage Server A (112A), Storage Server N (112N)).

Figure 2:
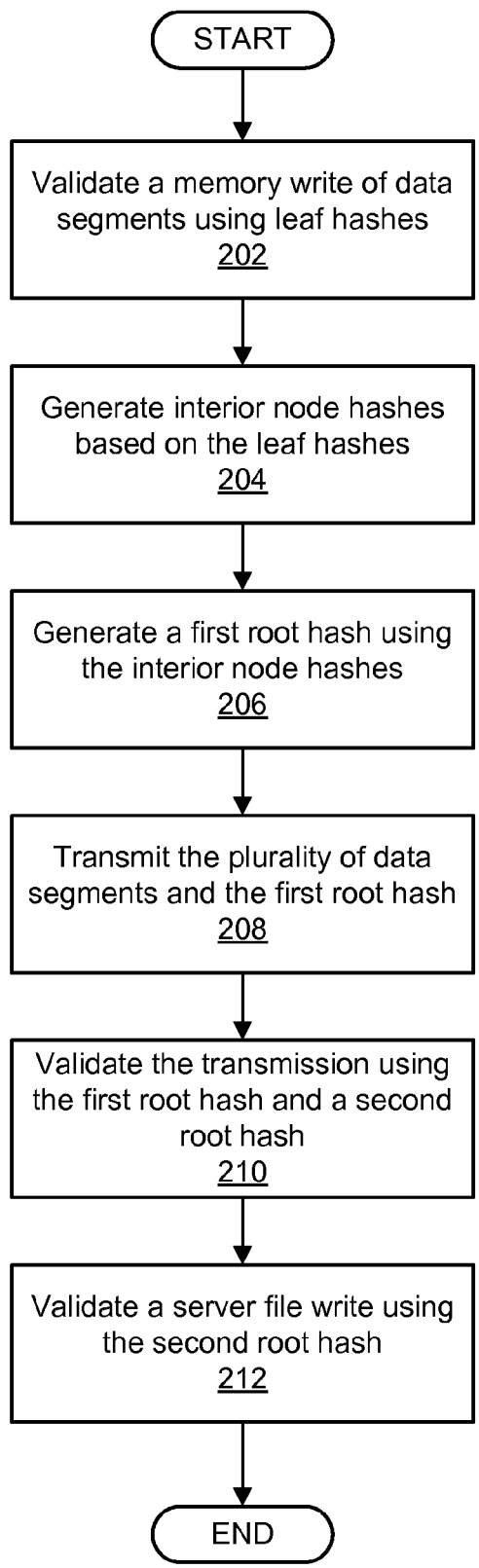
FIG. 2 shows a flowchart of a method in accordance with one or more embodiments of the invention.

FIG. 2 shows a flowchart of a method for end-to-end data integrity in a network file system in accordance with one or more embodiments of the invention. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

In step 202, a memory write of data segments is validated using leaf hashes of a hash tree. The memory write may correspond to a write of the data segments to memory of a client node as discussed above with respect to FIG. 1. In this case, a leaf hash may be generated for each data segment prior to performing the memory write. For example, a leaf hash may be generated for each data segment using a hash function. Examples of hash functions may include, but are not limited to, the Fletcher hash function, the secure hash algorithm, message direct algorithm, any other checksum or hash function, and/or any combination thereof. The leaf hashes may then be stored for later use in hash trees. Optionally, the integrity of the data segment in memory may be verified after the memory write is performed to ensure that the data was not corrupted during storage.

In one or more embodiments of the invention, a particular Fletcher hash function known as the Fletcher-4 hash function may be used to generate the hash tree. The Fletcher-4 hash function allows for leaf hash values for data segments to be combined into a single hash that is equivalent to computing a hash for all the data segments in a single pass. In this case, the Fletcher-4 hash function may be considered as a large matrix multiply as follows:

$$\begin{bmatrix} A \\ B \\ C \\ D \end{bmatrix} = \begin{bmatrix} a_1 & a_2 & a_3 & \cdots & a_n \\ b_1 & b_2 & b_3 & \cdots & b_n \\ c_1 & c_2 & c_3 & \cdots & c_n \\ d_1 & d_2 & d_3 & \cdots & d_n \end{bmatrix} * F$$

Where $a_i=1$, $b_i=i$, $c_i=i*(i+1)/2$, $d_i=i*(i+1)*(i+2)/6$, and F is a vector of 4-byte data values. For example, the hash h may be calculated in a single pass as follows:

$$h_n = \begin{bmatrix} 1 & 0 & 0 & 0 \\ 1 & 1 & 0 & 0 \\ 1 & 1 & 1 & 0 \\ 1 & 1 & 1 & 1 \end{bmatrix} * h_{(n-1)} + \begin{bmatrix} F_i \\ F_i \\ F_i \\ F_i \end{bmatrix}$$

Where if $F_i$ is set to 0 as an initial state, the equation may be reduced as follows:

$$h_n = \begin{bmatrix} 1 & 0 & 0 & 0 \\ 1 & 1 & 0 & 0 \\ 1 & 1 & 1 & 0 \\ 1 & 1 & 1 & 1 \end{bmatrix}^{delta} * h_{(n-delta)}$$

In this case, if there are 4-kilobyte leaf data segments computed on 4-byte data values, two adjacent left hashes may be combined by using the following matrix to offset the second hash:

$$M = \begin{bmatrix} 1 & 0 & 0 & 0 \\ 1 & 1 & 0 & 0 \\ 1 & 1 & 1 & 0 \\ 1 & 1 & 1 & 1 \end{bmatrix}^{(4096/4)} = \begin{bmatrix} 1 & 0 & 0 & 0 \\ 1024 & 1 & 0 & 0 \\ 524800 & 1024 & 1 & 0 \\ 179481600 & 542800 & 1024 & 1 \end{bmatrix}$$

Thus, the interior hash $C_{ij}$ may be calculated from the individual leaf hash values $C_i$ and $C_j$ using the following equation:

$$C_{ij} = C_i + M*C_j$$

Returning to FIG. 2, in step 204, interior node hashes of the hash tree are generated based on the leaf hashes. More specifically, an interior node hash may be generated by applying a hash function to the hashes of child nodes of the interior node. The child nodes of the interior node may correspond to leaf nodes or other interior nodes (i.e., the hash nodes are arranged in a hierarchical tree structure). As discussed above with respect to FIG. 1, each level of the hash tree may correspond to a particular block size of data (e.g., 4 kilobytes, 8 kilobytes, 16 kilobytes, etc.). Those skilled in the art will appreciate that different hash functions may be used for leaf hashes and interior node hashes. For example, a faster hash function may be used to generate the leaf hashes, which account for the majority of the data segments being hashed, and a more robust hash function (i.e., a hash function that increases the accuracy of the comparison of the data segments) may be used for the interior and root hash nodes.

In one or more embodiments, the client server and the network file system use the same hash function. In this case, writes to the network file system from a client node to a storage server, and in turn from the storage server to a local disk file system of the client node, may be configured to reuse previously computed hashes. More specifically, the previously computed hashes calculated from an interior hash function or a leaf hash function (depending on a disk block size of the local disk file system) may be reused, avoiding the need to recompute a different hash function for storage in the local disk file system.

In step 206, a first root hash of the hash tree is generated using the interior node hashes. The first root hash may correspond to a block size of a remote procedure call. In this case, the first root hash may be generated by applying a hash function to the hashes of the child interior node of the root hash (i.e., the first root hash is the root of the hash tree).

Those skilled in the art will appreciate that the generated hash tree may be the same as the hash trees discussed below with respect to FIG. 3, FIG. 4, or FIG. 5. For example, if the data segments are discontiguous, a discontiguous hash tree as discussed below with respect to FIG. 4 may be generated, where the leaf hashes generated in step 202 have vacancies for the missing data segments. In this example, if a subsequent submission of data segments is performed, the previously generated leaf hashes of the discontiguous hash tree may be reused to perform steps 202-206 even if some of the missing data segments are added because the overall structure of the hash tree is unchanged (i.e., the vacancies in the hash tree may be filled, allowing the remaining portions of the hash tree to be reused).

In step 208, the plurality of data segments are transmitted. For example, the plurality of data segments and the first root hash may be transmitted from the client node to a Network File System, where the transmission is performed using the remote procedure call size. In this example, the transmission of the plurality of data segments may be validated as discussed below using the first root hash. Those skilled in the art will appreciate that the same leaf hashes generated in step 202 may be reused to generate further root rashes to include in subsequent transmissions from the client node.

In step 210, the transmission of the plurality of data segments may be validated using the first root hash. For example, an additional hash tree may be generated by the network file system using the data segments as described above with respect to steps 202-206, where the additional hash tree includes a second root hash. In this example, the data integrity of the transmission of the plurality of data segments may be validated by comparing the first root hash and the second root hash. If the first root hash and the second root hash are equal, it may be determined that the data segments sent by the client node are the same as the data segments received by the network file system. Those skilled in the art will appreciate that the certainty of the data integrity validation is a factor of the hash function (i.e., a more robust hash function would result in a higher certainty that the transmission is valid).

In step 212, a server write of the plurality of data segments may be validated using the second hash tree. More specifically, leaf hashes initially generated when the second hash tree was generated in step 210 may be reused to validate the data integrity of the server write. In this case, the server write may be the storage of the data segments in storage servers of the network file system.

Those skilled in the art will appreciate that steps 202-212 describe a scenario for ensuring end-to-end data integrity when a client node submits data segments to a network file system for storage. However, steps 202-212 may also be performed in reverse order to ensure end-to-end data integrity when a client node requests retrieval of data segments from the network file system. More specifically, the data integrity of the data segments may be verified as the data is retrieved from the storage servers by the network file system using a first hash tree comprising a first root hash (i.e., step 212). In this case, the first root hash generated by the network file system may be transmitted with the plurality of data segments from the network file system to the client node requesting the data segments, where the first root hash is compared to a second root hash of a second hash tree generated by the client node to validate the transmission (i.e., step 210). Further, the client node may then also validate the storage of the data segments into memory or a local disk file system of the client node using the previously generated leaf nodes of the second hash tree (i.e., step 202). In this case, the reuse of the previously generated leaf nodes of the second hash tree allows the hash stored for each memory block or local disk file system block to be reused unchanged when computing interior hashes and/or a root hash of subsequent hash trees.

Those skilled in the art will appreciate that the client node and/or network file system may be required to handle partial block writes. For example, if the hash of an existing data segment is validated, the data segment is modified with new data, and then the hash of the modified data segment is computed, a small window exists during which either the unmodified data or the new data may be corrupted prior to the hash being computed for the modified data segment (i.e., the hash is computed on the corrupt data). To avoid this scenario, the hash of the modified data segment may be computed first, and then the hash of the original data segment is verified afterward, to ensure that if the data is corrupted before the new hash is computed, the corruption will be detected by verification of the original hash.

Figure 3:
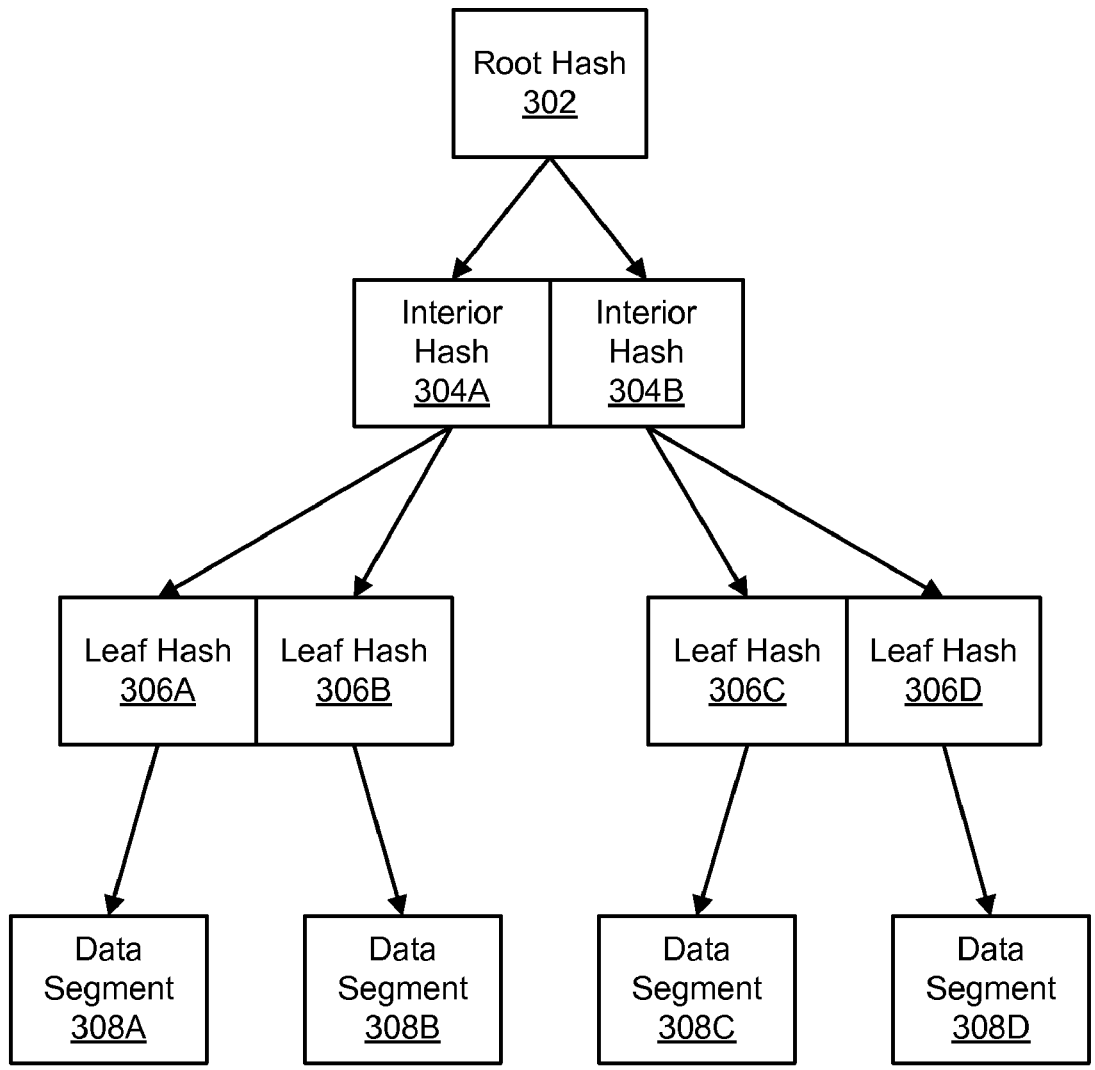
FIG. 3 shows a diagram of a hash tree in accordance with one or more embodiments of the invention.

FIG. 3 shows a diagram of a hash tree in accordance with one or more embodiments of the invention. In one or more embodiments of the invention, the hash tree includes a root hash (302), one or more levels of interior hashes (304A, 304B), leaf hashes (306A, 306B, 306C, 306D), and data segments (308A, 308B, 308C, 308D. The root hash (302) typically includes a pointer to child interior hashes (304A, 304B). In one embodiment of the invention, leaf hashes (306A, 306B, 306C, 306D) may include pointers that reference data segments (308A, 308B, 308C, 308D). The data segments (308A, 308B, 308C, 308D) contain actual data of files stored in memory or a file system. One skilled in the art will appreciate that several layers of interior hashes may exist between the root hash (302) and the data segments (308A, 308B, 308C, 308D).

In one or more embodiments of the invention, the root hash (302) is generated by applying a hash function to the child interior hashes (304A, 304B) of the root hash. Specifically, the root hash (302) is generated by applying the hash function to previously generated hashes of the child interior hashes (304A, 304B), where each of the interior hashes (304A, 304B) are generated by applying the hash function to child hashes of the interior hashes (i.e., leaf hashes 306A and 306B are child hashes of interior hash 304A, leaf hashes 306C and 306D are child hashes of interior hash 304B).

In one or more embodiments of the invention, each level of the hash tree is associated with a different block size. For example, if each data segment (308A, 308B, 308C, 308D) has a block size of 4 kilobytes, each of the leaf hashes (306A, 306B, 306C, 306D) is associated with a block size of 4 kilobytes. In this example, each of the interior hashes (304A, 304B) is associated with a block size of 8 kilobytes (i.e., the block size of a data block that includes two data segments), and the root hash is associated with a block size of 16 kilobytes (i.e., the block size of a data block that includes four data segments). Those skilled in the art will appreciate that the block size of data segments and hashes may vary based upon the requirements of the data system.

In one or more embodiments of the invention, each of the leaf hashes (306A, 306B, 306C, 306D) is generated by applying a hash function to a respective data segment (308A, 308B, 308C, 308D). In this case, each of the leaf hashes (306A, 306B, 306C, 306D) may be used to verify the data integrity of the respective data segment (308A, 308B, 308C, 308D). Further, each interior hash (304A, 304B) may be used to verify the data integrity of data segments related to the interior hash in the hash tree hierarchy (i.e., interior hash 304A may be used to verify the data integrity of a data block including data segments 308A and 308B, interior hash 304B may be used to verify the data integrity of a data block including data segments 308C and 308D). Similarly, the root hash (302) may be used to verify the data integrity of all the data segments (i.e., a data block including data segments 308A, 308B, 308C, and 308D).

In one or more embodiments of the invention, levels of the hash tree may be generated on demand from the leaf hashes (306A, 306B, 306C, 306D) to the root hash (302). For example, when a data integrity verification of the individual data segments (i.e., 308A, 308B, 308C, and 308D) is required, the leaf hashes (306A, 306B, 306C, 306D) may be generated. In this example, at a later time when a data integrity verification of a data block including data segments 308A and 308B and/or a data block including data segments 308C and 308D, the interior hashes (304A, 304B) may be generated. Finally in this example, when a data integrity verification of a data block including data segments 308A, 308B, 308C, and 308D is required, the root hash (302) may be generated. Those skilled in the art will appreciate that each level of the hash tree may generated using a stored copy of the previously generated hash levels.

Figure 4:
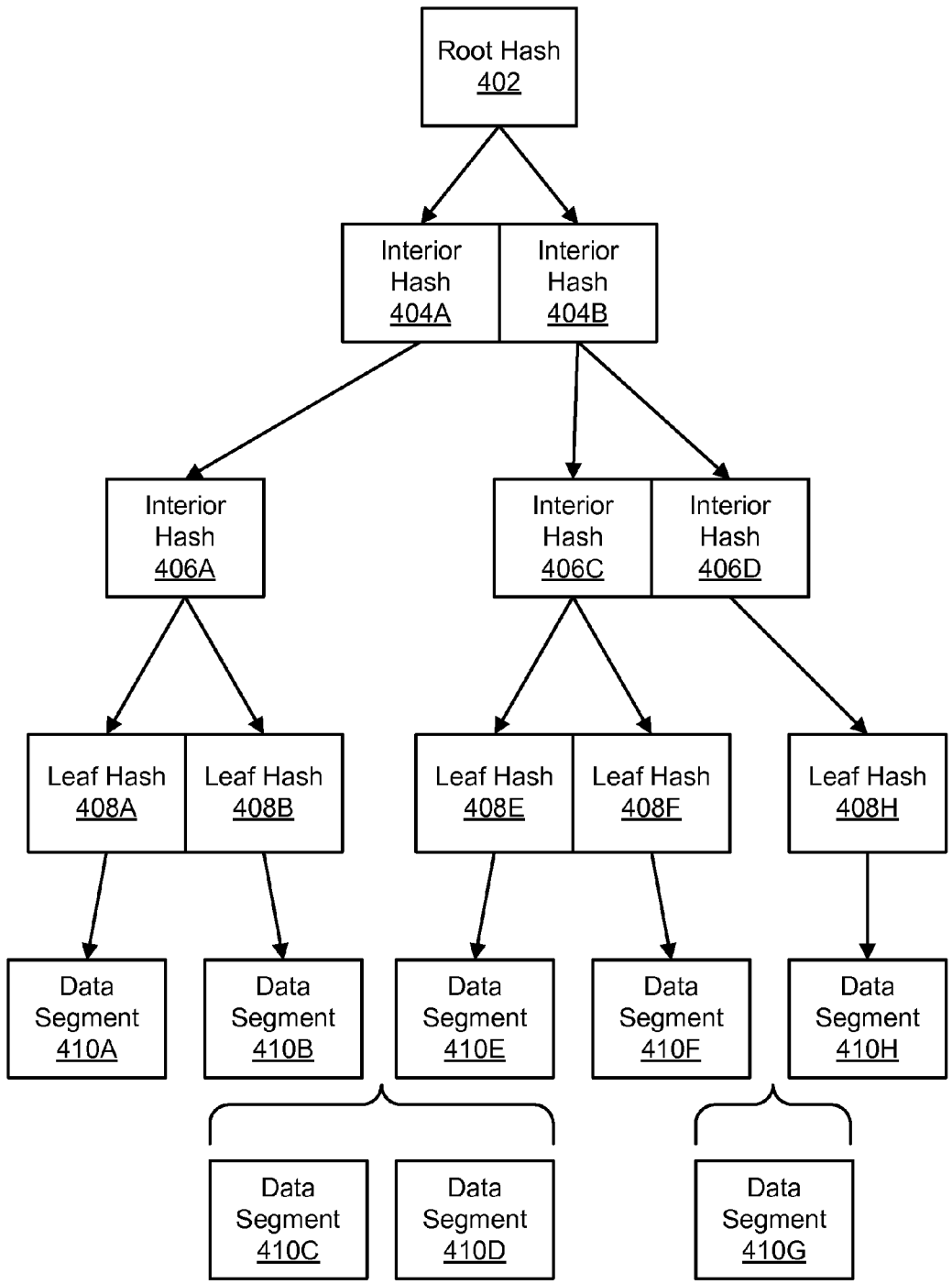
FIG. 4 shows a diagram of a discontiguous hash tree in accordance with one or more embodiments of the invention.

FIG. 4 shows a diagram of a discontiguous hash tree in accordance with one or more embodiments of the invention. In one or more embodiments of the invention, the hash tree includes a root hash (402), one or more levels of interior hashes (404A, 404B, 406A, 406C, 406D), leaf hashes (408A, 408B, 408E, 408F, 408H), and data segments (410A, 410B, 410E, 410F, 410H). FIG. 4 also shows data segments (410C, 410D, 410G) that are not included in the discontiguous hash tree. The discontiguous hash tree may be generated and used as described above with respect to FIG. 3. In this example, indirect hash 404A and indirect hash 406D each only include a pointer to a single child node (i.e., indirect hash 404A and indirect hash 406D are unaligned). In this case, the hash of the single child node is promoted unchanged up the hash tree to the parent node.

In one or more embodiments of the invention, the discontiguous hash tree maintains the structure of the underlying discontiguous data segments (410A, 410B, 410E, 410F, 410H). In other words, vacancies exist in the discontiguous hash tree for missing data segments (410C, 410D, 410G) of the discontiguous data segments (410A, 410B, 410E, 410F, 410H). In this case, the root hash (402) may be used to perform a data verification of a data block including all the discontiguous data segments (410A, 410B, 410E, 410F, 410H). Further, the organization of the discontiguous hash tree ensures that the previously generated leaf hashes (408A, 408B, 408E, 408F, 408H) may be reused in future data integrity verifications. For example, if data segment (410G) was added to the data segments being verified, a leaf hash for data segment (410G) could be generated and inserted into the existing discontiguous hash tree. In this example, the previously generated hashes (408A, 408B, 408E, 408F, 408H) are reused along with the newly generated leaf hash to recomputed the interior hashes (e.g., 404B, 406D) and the root hash (402).

Figure 5:
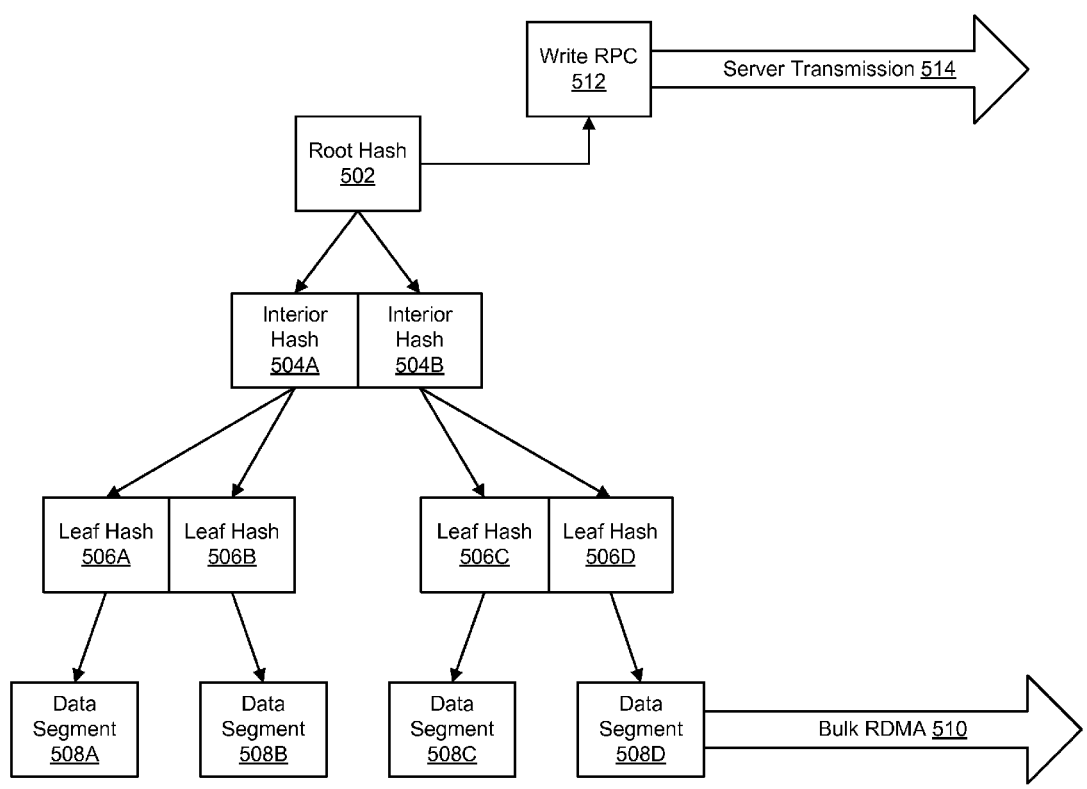
FIG. 5 shows an example in accordance with one or more embodiments of the invention.

FIG. 5 shows an example of a transmission of a plurality of data segments in accordance with one or more embodiments of the invention. In one or more embodiments of the invention, the hash tree includes a root hash (502), one or more levels of interior hashes (504A, 504B), leaf hashes (506A, 506B, 506C, 506D), and data segments (508A, 508B, 508C, 508D). The hash tree in this example may be generated as described above with respect to FIG. 3.

In this example, a base data segment size of 4 kilobytes for each of the data segments (508A, 508B, 508C, 508D) is used, regardless of the memory page size. A set of leaf hashes (506A, 506B, 506C, 506D) is generated for each data segment (508A, 508B, 508C, 508D) using a leaf hash function. The leaf hashes may be generated while the data segments are being copied into memory (e.g., during a bulk remote direct memory access (RDMA) in step 510) and stored with the memory pages until the data segments are transmitted over the network. If the memory page size is larger than the data segment size, then multiple data segment hashes are computed and stored per memory page as interior hashes (504A, 504B). At this stage, the RDMA has triggered the generation of the leaf hashes (506A, 506B, 506C, 506D) and the interior hashes (504A, 504B) of the hash tree. In step 510, the interior hashes (504A, 504B) may be used to verify the data integrity of the data segments copied into memory during the bulk RDMA.

When the data segments are combined into a write remote procedure call (RPC) buffer (512), the remaining portions of the hash tree may be generated. In this example the remaining portions include the root hash (502); however, one skilled in the art will appreciate that several layers of interior hashes may exist between the root hash (502) and the leaf hashes (506A, 506B, 506C, 506D). The generation of the root hash (502) reuses the previously generated interior hashes (504A, 504B) and leaf hashes (506A, 506B, 506C, 506D) of the hash tree, allowing for the root hash (502) to be generated without having to regenerate hashes for each of the data segments (508A, 508B, 508C, 508D) and memory pages. In step 514, The root hash (502) is included in the write RPC buffer (512) that is transmitted along with the combined data segments (508A, 508B, 508C, 508D) to the network file system.

Once the content of the write RPC buffer (512) is received by the network file system, the network file system may generate a second root hash in a second hash tree using the combined data segments to verify the integrity of the transmission. If the root hash does not match the second root hash, the distributed file server will request that the data segments be resent because the integrity of the data segments may have been violated during the transmission. In this case, the process described above may be repeated until the data integrity of the transmission of the data segments (508A, 508B, 508C, 508D) is verified.

Embodiments of the invention may be implemented on virtually any type of computer regardless of the platform being used. For example, each of the client nodes, the network file system, the metadata server, and the storage servers as described above with respect to FIG. 1 may correspond to a computer system including one or more processor(s), associated memory (e.g., random access memory (RAM), cache memory, flash memory, etc.), a storage device (e.g., a hard disk(s), an optical drive such as a compact disk drive or digital video disk (DVD) drive, flash memory, etc.), and numerous other elements and functionalities typical of today's computers. The computer system may also include input means, such as a keyboard, a mouse, or a microphone. Further, the computer system may include output means, such as a monitor (e.g., a liquid crystal display (LCD), a plasma display, or cathode ray tube (CRT) monitor). The computer system may be connected to a network (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Further, the computer system includes at least the minimal processing, input, and/or output means necessary to particularly practice embodiments of the invention.

Further, those skilled in the art will appreciate that one or more elements of the aforementioned computer system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated tangible memory. The node may alternatively correspond to a processor with shared memory and/or resources.

Computer readable instructions to perform embodiments of the invention may be stored on a computer readable storage medium such as a compact disc (CD), a diskette, a tape, tangible memory, or any other tangible computer readable storage medium that includes functionality to store computer readable instructions to perform embodiments of the invention. In one embodiment of the invention the computer readable instructions, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium, embodying instructions executable by a computer to perform a method, the method comprising:
   validating a memory write of a plurality of data segments using a first plurality of leaf hashes, wherein each of the first plurality of leaf hashes is associated with one of the plurality of data segments of a first block size;
   generating a plurality of interior node hashes based on the first plurality of leaf hashes, wherein each of the plurality of interior node hashes is associated with a second block size;
   generating a first root hash using the plurality of interior node hashes, wherein the first root hash is associated with a remote procedure call size, wherein the first plurality of leaf hashes, the plurality of interior node hashes, and the first root hash are all part of a first hash tree;
   transmitting the first root hash and the plurality of data segments to a network file system, wherein the transmission is performed using the remote procedure call size; and
   validating the transmission of the plurality of data segments using the first root hash, wherein validating the transmission of the plurality of data segments comprises:
      generating a second hash tree using the plurality of data segments, wherein the second hash tree comprises a second root hash; and
      validating the transmission of the plurality of data segments by comparing the first root hash to the second root hash.

2. The non-transitory computer readable storage medium of claim 1, the method further comprising:
   validating a server write of the plurality of data segments using a second plurality of leaf hashes of the second hash tree.

3. The non-transitory computer readable storage medium of claim 1, wherein each of the plurality of leaf hashes is generated using a first hash function, and wherein each of the plurality of interior node hashes is generated using a second hash function.

4. The non-transitory computer readable storage medium of claim 3, wherein each of the plurality of leaf hashes is generated by applying the first hash function to a corresponding one of the plurality of data segments, and wherein each of the plurality of interior node hashes is generated by applying the second hash function to at least two of the plurality of leaf hashes.

5. The non-transitory computer readable storage medium of claim 1, wherein the hash tree is a discontiguous hash tree, and wherein one of the plurality of leaf hashes is unaligned and promoted unchanged when the plurality of interior nodes is generated.

6. The non-transitory computer readable storage medium of claim 1, wherein the first block size is 4 kilobytes, and wherein the remote procedure call size is 1024 kilobytes.

7. A system, comprising:
   a client node comprising a processor and a memory, the memory comprising software instructions for enabling the processor to:
      validate a memory write of a plurality of data segments using a first plurality of leaf hashes, wherein each of the first plurality of leaf hashes is associated with one of the plurality of data segments of a first block size;
      generate a plurality of interior node hashes based on the first plurality of leaf hashes, wherein each of the plurality of interior node hashes is associated with a second block size;
      generate a first root hash using the plurality of interior node hashes, wherein the first root hash is associated with a remote procedure call size, wherein the first plurality of leaf hashes, the plurality of interior node hashes, and the first root hash are all part of a first hash tree; and
      transmit the first root hash and the plurality of data segments to a network file system, wherein the transmission is performed using the remote procedure call size; and
   the network file system configured to:
      generate a second hash tree using the plurality of data segments, wherein the second hash tree comprises a second root hash,
      validate the transmission of the plurality of data segments using the first root hash by comparing the first root hash to the second root hash.

8. The system of claim 7, wherein the network file system is further configured to:
   validate a server write of the plurality of data segments using a second plurality of leaf hashes of the second hash tree.

9. The system of claim 7, wherein each of the plurality of leaf hashes is generated using a first hash function, and wherein each of the plurality of interior node hashes is generated using a second hash function.

10. The system of claim 9, wherein each of the plurality of leaf hashes is generated by applying the first hash function to a corresponding one of the plurality of data segments, and wherein each of the plurality of interior node hashes is generated by applying the second hash function to at least two of the plurality of leaf hashes.

11. The system of claim 7, wherein the hash tree is a discontiguous hash tree, and wherein one of the plurality of leaf hashes is unaligned and promoted unchanged when the plurality of interior nodes is generated.

12. The system of claim 7, wherein the first block size is 4 kilobytes, and wherein the remote procedure call size is 1024 kilobytes.

13. A method for ensuring data integrity using hash trees, comprising:
- validating a memory write of a plurality of data segments using a first plurality of leaf hashes, wherein each of the first plurality of leaf hashes is associated with one of the plurality of data segments of a first block size;
- generating a plurality of interior node hashes based on the first plurality of leaf hashes, wherein each of the plurality of interior node hashes is associated with a second block size;
- generating a first root hash using the plurality of interior node hashes, wherein the first root hash is associated with a remote procedure call size, wherein the first plurality of leaf hashes, the plurality of interior node hashes, and the first root hash are all part of a first hash tree;
- transmitting the first root hash and the plurality of data segments to a network file system, wherein the transmission is performed using the remote procedure call size; and
- validating the transmission of the plurality of data segments using the first root hash, wherein validating the transmission of the plurality of data segments comprises:
  - generating a second hash tree using the plurality of data segments, wherein the second hash tree comprises a second root hash; and
  - validating the transmission of the plurality of data segments by comparing the first root hash to the second root hash.

14. The method of claim 13, further comprising:
validating a server write of the plurality of data segments using a second plurality of leaf hashes of the second hash tree.

15. The method of claim 13, wherein each of the plurality of leaf hashes is generated using a first hash function, and wherein each of the plurality of interior node hashes is generated using a second hash function.

16. The method of claim 15, wherein each of the plurality of leaf hashes is generated by applying the first hash function to a corresponding one of the plurality of data segments, and wherein each of the plurality of interior node hashes is generated by applying the second hash function to at least two of the plurality of leaf hashes.

17. The method of claim 13, wherein the hash tree is a discontiguous hash tree, and wherein one of the plurality of leaf hashes is unaligned and promoted unchanged when the plurality of interior nodes is generated.

* * * * *

UNITED STATES PATENT AND TRADEMARK OFFICE
CERTIFICATE OF CORRECTION

PATENT NO. : 8,386,835 B2
APPLICATION NO. : 12/781516
DATED : February 26, 2013
INVENTOR(S) : Dilger et al.

It is certified that error appears in the above-identified patent and that said Letters Patent is hereby corrected as shown below:

On the Title Page:

Item (57) "Abstract", line 11, delete "rash" and insert -- hash --, therefor.

In the Specifications:

In column 10, line 39, delete "The" and insert -- the --, therefor.

Signed and Sealed this
Ninth Day of July, 2013

Teresa Stanek Rea
*Acting Director of the United States Patent and Trademark Office*